United States Patent
Chou

(10) Patent No.: US 7,519,205 B2
(45) Date of Patent: Apr. 14, 2009

(54) BIOMETRICS METHOD BASED ON A THERMAL IMAGE OF A FINGER

(75) Inventor: Bruce C. S. Chou, Hsin Chu (TW)

(73) Assignee: Egis Technology Inc., Taipei (TW)

( * ) Notice: Subject to any disclaimer, the term of this patent is extended or adjusted under 35 U.S.C. 154(b) by 0 days.

(21) Appl. No.: 12/068,068

(22) Filed: Feb. 1, 2008

(65) Prior Publication Data
US 2008/0199058 A1 Aug. 21, 2008

(30) Foreign Application Priority Data
Feb. 9, 2007 (TW) .............................. 96104697 A

(51) Int. Cl.
*G06K 9/00* (2006.01)
(52) U.S. Cl. .................. 382/124; 382/125; 382/190; 713/186; 902/3; 340/5.53; 396/15
(58) Field of Classification Search ............... 382/124, 382/115, 125, 127, 116, 312, 190, 218, 278, 382/126, 100, 117, 191; 219/543, 522, 201; 713/186, 182; 235/382, 380; 250/556, 208.1, 250/338.4; 340/5.83, 5.53; 257/522; 902/3; 356/71, 39, 41; 396/15; 600/310, 322, 323, 600/326, 473, 476
See application file for complete search history.

(56) References Cited

U.S. PATENT DOCUMENTS

| | | | | |
|---|---|---|---|---|
| 4,429,413 A | * | 1/1984 | Edwards | 382/124 |
| 5,940,526 A | * | 8/1999 | Setlak et al. | 382/124 |
| 5,974,338 A | * | 10/1999 | Asano et al. | 600/323 |
| 6,173,068 B1 | * | 1/2001 | Prokoski | 382/115 |
| 6,546,122 B1 | | 4/2003 | Russo | |
| 6,633,656 B1 | * | 10/2003 | Picard | 382/124 |
| 7,273,170 B2 | * | 9/2007 | Katsumata et al. | 235/382 |
| 7,280,676 B2 | * | 10/2007 | Miura et al. | 382/115 |
| 2004/0208345 A1 | | 10/2004 | Chou et al. | |
| 2005/0175225 A1 | * | 8/2005 | Shinzaki | 382/124 |
| 2007/0036400 A1 | * | 2/2007 | Watanabe et al. | 382/124 |
| 2007/0177769 A1 | * | 8/2007 | Motoyama et al. | 382/115 |

FOREIGN PATENT DOCUMENTS

| | | |
|---|---|---|
| EP | 1834581 A1 | 9/2007 |
| JP | 2004234040 | 8/2004 |
| WO | WO-2005078636 A2 | 8/2005 |
| WO | WO-2005111916 A1 | 11/2005 |

* cited by examiner

Primary Examiner—Sheela C Chawan
(74) Attorney, Agent, or Firm—Muncy, Geissler, Olds & Lowe, PLLC

(57) ABSTRACT

A biometrics method based on a thermal image of a finger includes the steps of: acquiring the thermal image of the finger; and extracting a finger-print image or a finger-vein image from the thermal image and thus verifying a user's identity according to the finger-print image or the finger-vein image.

5 Claims, 4 Drawing Sheets

14

12

10
P1 P2 P3 P4

BIOMETRICS METHOD BASED ON A THERMAL IMAGE OF A FINGER

BACKGROUND OF THE INVENTION

1. Field of Invention

The invention relates to a biometrics method based on a thermal image of a finger, and more particularly to a method of verifying a user's identity according to a finger-print image and a finger-vein image. The fingerprint sensing chip adapted to the invention has been disclosed in the commonly assigned U.S. Patent Publication No. US2004/0208345A1.

2. Related Art

The conventional biometrics verification may be performed based on a fingerprint of a finger of a user. The fingerprint recognition has the advantages of the high precision and the convenience and has the international standard of algorithm. However, some users having special works may have no fingerprint. For example, the finger of the cement worker or the chemical worker is eroded by cement or chemicals for a long time so that no obvious fingerprint exists on the finger. Any fingerprint sensor, such as the optical-type sensor, the pressure-type sensor, the capacitive sensor or the electric field type sensor, cannot acquire the fingerprint of this kind of user. Some techniques have declared that the fingerprint on the derma layer under the skin can be sensed. However, contamination, oil and any other substance are usually attached to the finger and thus interfere with the detection of the derma layer. If the finger is wetted, the conventional fingerprint sensor device cannot sense the good finger-print image. Thus, the spirit of the invention is to provide a biometrics method capable of overcoming the problems induced when no fingerprint exists on the finger and when the finger is wetted.

To solve the above-mentioned problems, the present inventor has disclosed a thermoelectric sensor for fingerprint thermal imaging disclosed in US2004/0208345A1. An array element is manufactured according to the thermoelectric sensing principle so that the finger ridges and valleys can be sensed. The sensing member works based on the principle of sensing the contacted body heat conduction (temperature difference) or the principle of sensing thermal infrared emitting from the finger to the sensing members in a small gap. Different substances, such as water and the skin (the wetted finger) or air and the skin (the dry finger) have different thermoconductive properties and different infrared material properties. Thus, different images with different contrasts can be obtained so that the fingerprint recognition can be performed. The invention further provides the method of sensing the veins of the finger based on the sensing principle of the sensor so that the user without the obvious fingerprint pattern on the finger can be verified and the true finger and the fake finger can be distinguished.

FIG. 6 is a schematic illustration showing a thermoelectric sensor for fingerprint thermal imaging disclosed in US2004/0208345A1. As shown in FIG. 6, each sensing member 10' is formed by integrated circuit manufacturing processes, especially the CMOS manufacturing processes. The basic structure of the sensing member 10' includes a silicon substrate 100, a local oxidation of silicon (LOCOS) layer 101, a thermopile composed of at least one thermocouple 102 or many thermocouples connected in series, and a heat pipe 400. The thermopile has a hot junction 200 disposed at a central portion of the LOCOS layer 101, and a cold junction 300 disposed on a thin oxide layer (not shown) around the LOCOS layer 101. The structure of the heat pipe 400 includes at least one metal interconnect layer and at least one via hole metal plug. The heat pipe 400 is formed between the central portion of the LOCOS layer 101 and a passivation layer 106 on the outermost surface.

The fingerprint includes a fingerprint ridge 20 and a fingerprint valley 21. When the fingerprint ridge 20 contacts or approaches the sensing member 10', heat or infrared radiation is generated between the fingerprint ridge 20 and the sensing member 10', and is transferred through the solid heat conducting mechanism in directions as indicated by the two arrows. Most heat can be conducted to the hot junction 200 of the thermopile on the LOCOS layer 101 through the heat pipe 400, and then transferred in various directions through the hot junction 200. Therefore, a temperature difference $\Delta T$ is generated between the hot junction 200 and the cold junction 300. The sensing member 10' senses a voltage signal through the temperature difference $\Delta T$ in order to judge whether it contacts with the fingerprint ridge 20 or not. The voltage signal generated by the sensing member 10' may be represented by the following equation:

$$V = N\alpha\Delta T \tag{1}$$

wherein N is the number of the thermocouples connected in series, and $\alpha$ is a Seebeck coefficient (V/° C.) of a single thermocouple.

It is to be noted that the heat pipe 400 can enhance the temperature difference in order to produce the maximum temperature difference between the hot junction 200 and the cold junction 300 of the thermocouple 102. According to this property, the finger-print image and the finger-vein image can be sensed so that the spirit of US2004/0208345A1 can be extended.

SUMMARY OF THE INVENTION

It is therefore an object of the invention to provide a biometrics method based on a thermal image of a finger, wherein a user's identity can be verified according to a finger-print image and a finger-vein image.

To achieve the above-identified object, the invention provides a biometrics method. The method includes the steps of: acquiring a thermal image of a finger; and extracting one or both of a finger-print image and a finger-vein image from the thermal image.

Then, the finger-print image may be compared with a finger-print template to obtain a first compared result, and the finger-vein image may be compared with a finger-vein template to obtain a second compared result. Then, the identity recognition or another characteristic recognition can be performed according to one or both of the first compared result and the second compared result.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Veins are distributed over a finger in a pattern, which represents the unique feature to a person. Thus, the invention provides a biometrics method based on a thermal image of the finger. A thermal-type or infrared-type sensing member device, which contacts or approaches the finger, is used in conjunction with the signal or data processing approach of the invention so that the thermal image composed of a finger-print image and a finger-vein image can be obtained. The principle of the sensing member may be found in US2004/0208345A1 mentioned hereinabove, in which the thermoelectric sensor is disclosed. Also, the sensor may also be other types of sensors, such as a pyro-electric sensor, a bolometric sensor, any other contact-type or non-contact-type temperature-sensor or infrared sensor. If the fingerprint of the user is eroded, the user's identify may be verified according to the finger-vein image. If the user's fingerprint still exists, the user's identify may be verified according to one or both of the finger-print image and the finger-vein image. The finger-vein image only can be obtained when the finger is true and live because the temperature of the vein is higher. Thus, the true and live finger may be judged according to the finger-vein image.

Figure 1:
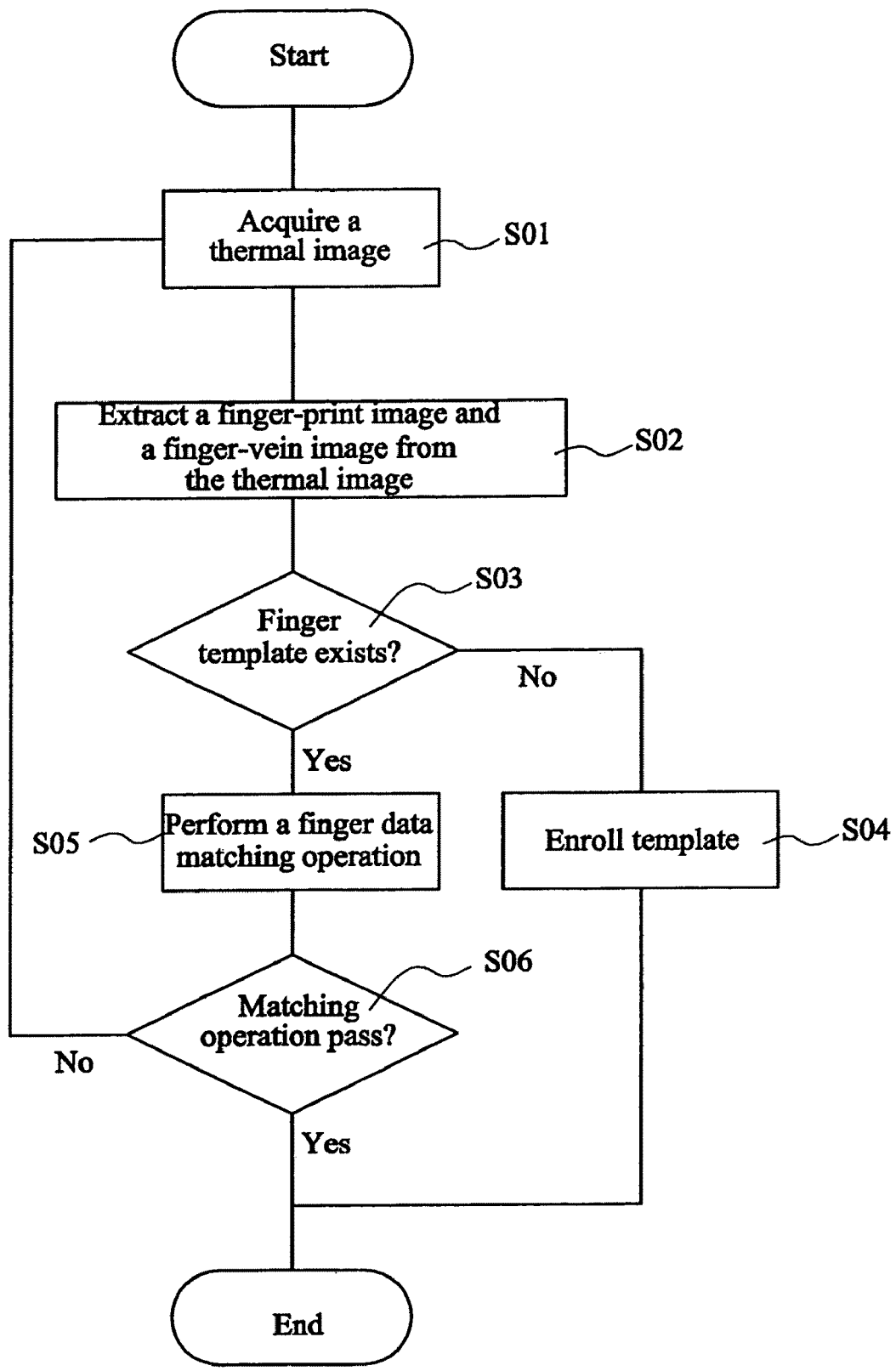
FIG. 1 is a flow chart showing a biometrics method based on a thermal image of a finger according to the invention.
Figure 4:
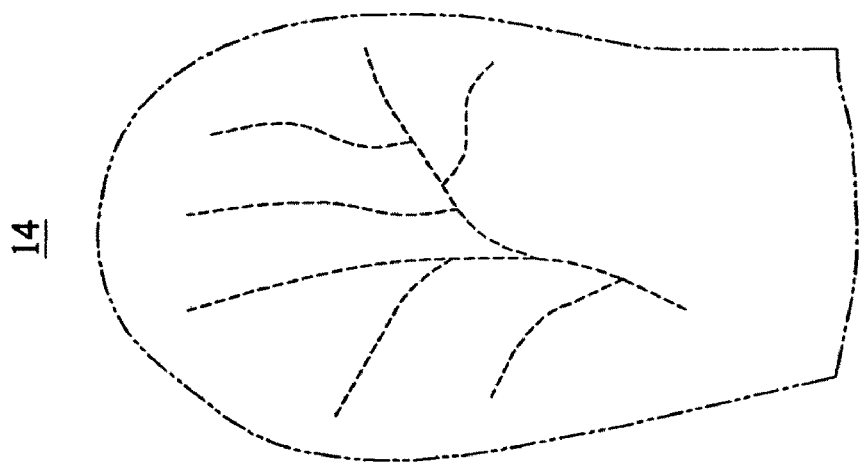
FIG. 4 shows a finger-vein image extracted from the thermal image of the invention.
Figure 3:
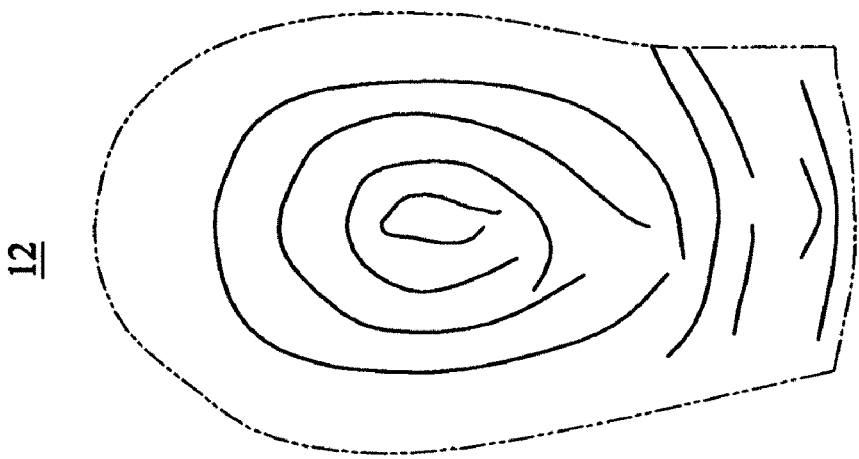
FIG. 3 shows a finger-print image extracted from the thermal image of the invention.
Figure 2:
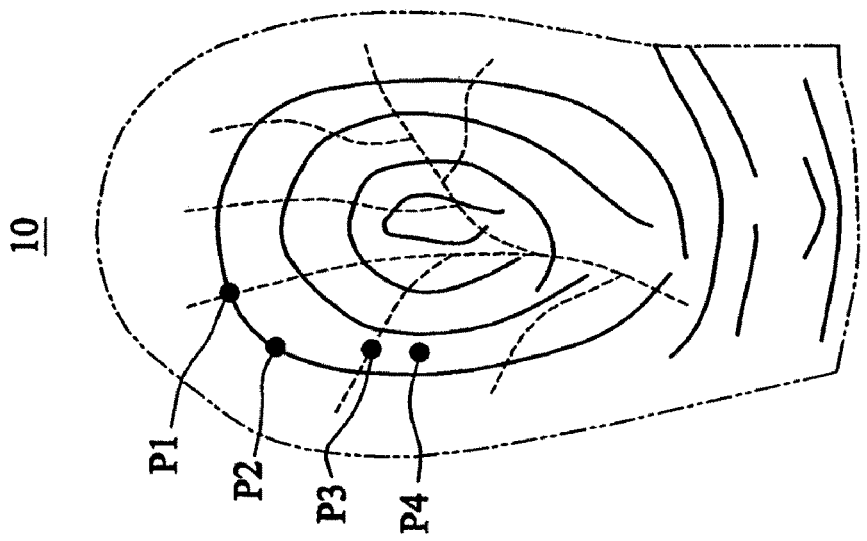
FIG. 2 shows the thermal image sensed by the biometrics method according to the invention.

FIG. 1 is a flow chart showing a biometrics method based on a thermal image of a finger according to the invention. FIG. 2 theoretically shows the thermal image sensed by the biometrics method according to the invention. FIGS. 3 and 4 show a finger-print image and a finger-vein image extracted from the thermal image of the invention. As shown in FIGS. 1 to 4, the biometrics method of the invention includes the following steps.

Figure 5:
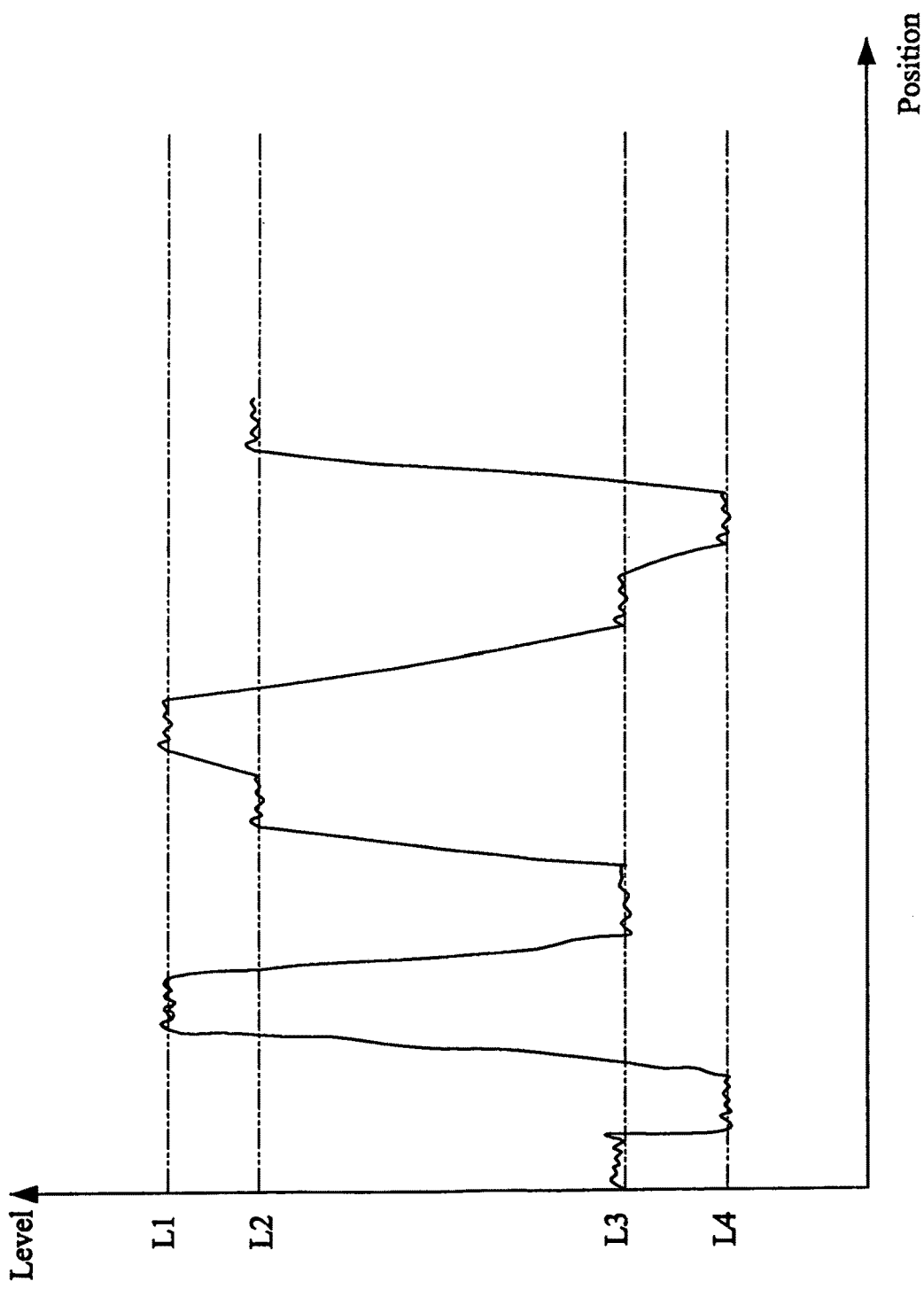
FIG. 5 is a graph showing a relationship between a first average level and a second average level.
Figure 6:
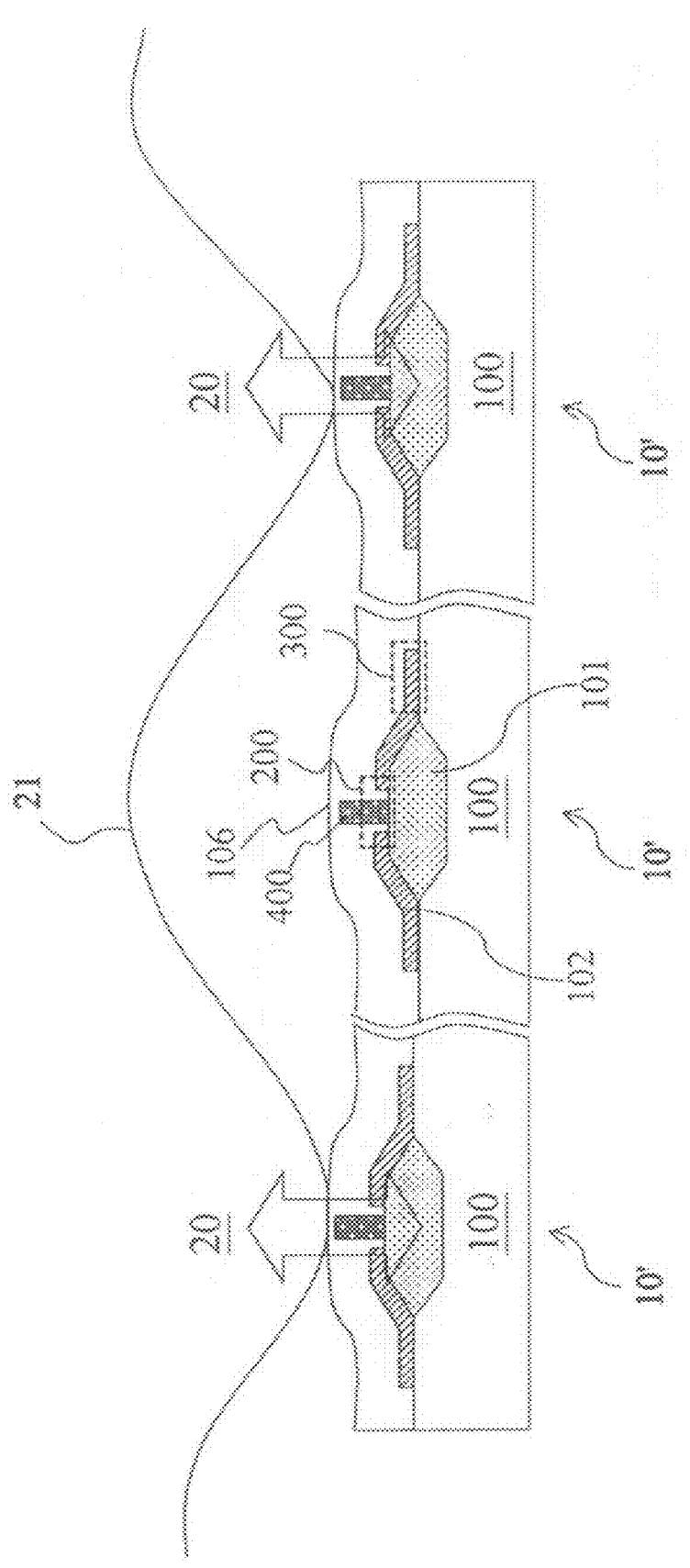
FIG. 6 is a schematic illustration showing a thermoelectric sensor for fingerprint thermal imaging disclosed: in US2004/0208345A1.

First, in step S01, a sensing member device is provided to acquire a thermal image 10 of a finger, as shown in FIG. 2. The thermal image 10 may include a finger-print image 12 and a finger-vein image 14, or only include the finger-print image 12 or the finger-vein image 14. For example, the thermal image 10 of FIG. 2 has several pixel points P1 to P4. The pixel point P1 corresponds to an overlapped portion between a ridge of the finger and a vein of the finger. The pixel point P2 corresponds to a portion where the ridge exists but no vein exists. The pixel point P3 corresponds to a portion where the vein exists but no ridge (or valley) exists. The pixel point P4 corresponds to a portion wherein no vein and no valley exist. In this embodiment, it is assumed that the voltage level of the pixel point P1 is the highest level. Therefore, the pixel points P1 to P4 respectively have average levels L1 to L4 corresponding to FIG. 5. For example, the finger-vein image 14 is composed of the pixel points P1 and P3. However, it is also possible to derive the finger-vein image 14 according to the distribution of the pixel points P1 and the mathematical model. For example, the finger-print image 12 is composed of the pixel points P1 and P2. In this embodiment, it is possible to set a signal output window above L2 so that the signal of the distribution pertaining to the pixel points P1 can be obtained and the information of the pixel points P3 and P4 is filtered out. Then, the finger-vein image can be obtained through the mathematical computation. In addition, the finger-vein image may also be obtained by an integrated circuit having the above-mentioned mathematical computation. The integrated circuit is formed in the chip so that the finger-vein image may be obtained directly and the problems of the system design can be decreased.

Then, in step S02, one or both of the finger-print image 12 and the finger-vein image 14 are extracted from the thermal image 10.

Next, in step S03, it is judged whether a finger template exists. If the finger template exists, the finger data matching operation can be performed in step S05. The finger template may include a finger-print template and a finger-vein template. The step S05 may be implemented according various approaches. For example, the graphic pattern recognition or the minutia point recognition can be performed. The compared result may be obtained according to the similarity of one or both of the finger-print template and the finger-vein template. Then, it is judged whether the finger data matching operation passes in step S06. If the finger data matching operation passes, the procedure ends; or otherwise the process goes back to the step S01.

Thus, the biometrics method of the invention further includes the following steps. First, the finger-print image is compared with the finger-print template to obtain a first compared result, which may be the similarity of 90%, for example. Next, the finger-vein image is compared with the finger-vein template to obtain a second compared result. Then, the user's identify is verified according to one or both of the first compared result and the second compared result.

When the comparison is performed according to the minutia points, the step of comparing the finger-print image with the finger-print template may include the steps of: extracting a plurality of first minutia points from the finger-print image to compare the first minutia points with the finger-print template. In addition, the step of comparing the finger-vein image with the finger-vein template may include the steps of: extracting a plurality of second minutia points from the finger-vein image and comparing the second minutia points with the finger-vein template.

When the comparison is performed according to the graphic pattern, the step of comparing the finger-print image with the finger-print template and the step of comparing the finger-vein image with the finger-vein template are performed by way of graphic pattern comparison.

When the finger template does not exist, the template has to be enrolled, as shown in step S04. Thus, the finger-print image and the finger-vein image are processed and then stored in a storage unit to serve as the finger-print template and the finger-vein template data in the step S04. The finger-print template and the finger-vein template data may be graphic data or minutia point data. When the finger-print template and the finger-vein template data are the minutia point data, the biometrics method of the invention may further include the following steps. First, a plurality of first minutia points is extracted from the finger-print image. Then, a plurality of second minutia points is extracted from the finger-vein image. Finally, the first minutia points and the second minutia points are stored to a storage unit to serve as a fingerprint template and a finger-vein template, respectively.

According to the biometrics method of the invention, the fingerprint and the vein of the finger can be recognized. When the user's fingerprint is eroded and the fingerprint thereof cannot be sensed or when the true finger has to be judged, the vein of the finger can be verified so that the verified result becomes more reliable.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A biometrics method, comprising the steps of:
    acquiring a thermal image of a finger by a sensing member device;
    extracting one or both of a finger-print image and a finger-vein image from the thermal image;
    comparing the finger-print image with a finger-print template to obtain a first compared result;
    comparing the finger-vein image with a finger-vein template to obtain a second compared result; and
    verifying a user's identity according to one or both of the first compared result and the second compared result, wherein:
    the step of comparing the finger-print image with the finger-print template comprises: extracting a plurality of first minutia points from the finger-print image and comparing the first minutia points with the finger-print template; and
    the step of comparing the finger-vein image with the finger-vein template comprises: extracting a plurality of second minutia points from the finger-vein image and comparing the second minutia points with the finger-vein template.

2. A biometrics method, comprising the steps of:
    acquiring a thermal image of a finger by a sensing member device;
    extracting both of a finger-print image and a finger-vein image from the thermal image;
    comparing the finger-print image with a finger-print template to obtain a first compared result;
    comparing the finger-vein image with a finger-vein template to obtain a second compared result; and
    verifying a user's identity according to both of the first compared result and the second compared result.

3. A biometrics method, comprising the steps of:
    acquiring a thermal image of a finger by a sensing member device;
    extracting one or both of a finger-print image and a finger-vein image from the thermal image;
    extracting a plurality of first minutia points from the finger-print image;
    extracting a plurality of second minutia points from the finger-vein image; and
    respectively storing the first minutia points and the second minutia points to a storage unit to serve as a finger-print template and a finger-vein template.

4. A biometrics method, comprising the steps of:
    acquiring a thermal image of a finger by a sensing member device;
    extracting one or both of a finger-print image and a finger-vein image from the thermal image;
    extracting a plurality of first minutia points from the finger-print image;
    extracting a plurality of second minutia points from the finger-vein image; and
    respectively storing the first minutia points and the second minutia points to a storage unit to serve as a finger-print template and a finger-vein template.

5. The method according to claim 4, wherein both of the finger-print image and the finger-vein image are extracted from the thermal image.

* * * * *